No. 790,964. PATENTED MAY 30, 1905.
A. T. KELLER.
BLOWING ENGINE VALVE.
APPLICATION FILED JULY 1, 1904.

2 SHEETS—SHEET 2.

WITNESSES
INVENTOR
A. T. Keller
by Bakewell & Byrnes
his attys

No. 790,964.                                    Patented May 30, 1905.

UNITED STATES PATENT OFFICE.

ALBERT T. KELLER, OF PITTSBURG, PENNSYLVANIA, ASSIGNOR OF ONE-HALF TO MESTA MACHINE COMPANY, OF PITTSBURG, PENNSYLVANIA, A CORPORATION OF PENNSYLVANIA.

BLOWING-ENGINE VALVE.

SPECIFICATION forming part of Letters Patent No. 790,964, dated May 30, 1905.

Application filed July 1, 1904. Serial No. 214,962.

*To all whom it may concern:*

Be it known that I, ALBERT T. KELLER, of Pittsburg, Allegheny county, Pennsylvania, have invented a new and useful Blowing-Engine Valve, of which the following is a full, clear, and exact description, reference being had to the accompanying drawings, forming part of this specification, in which—

Figure 1:
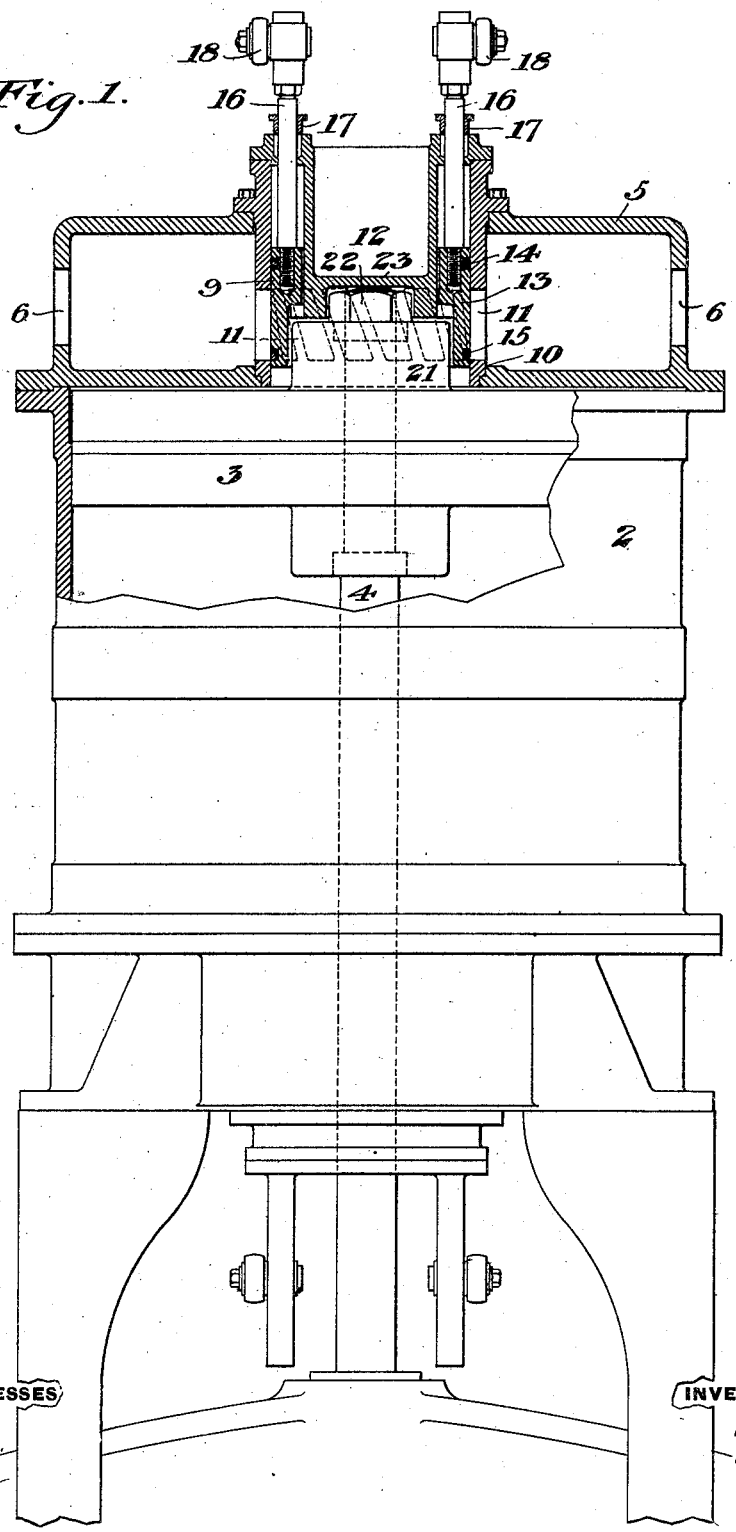
Figure 2:
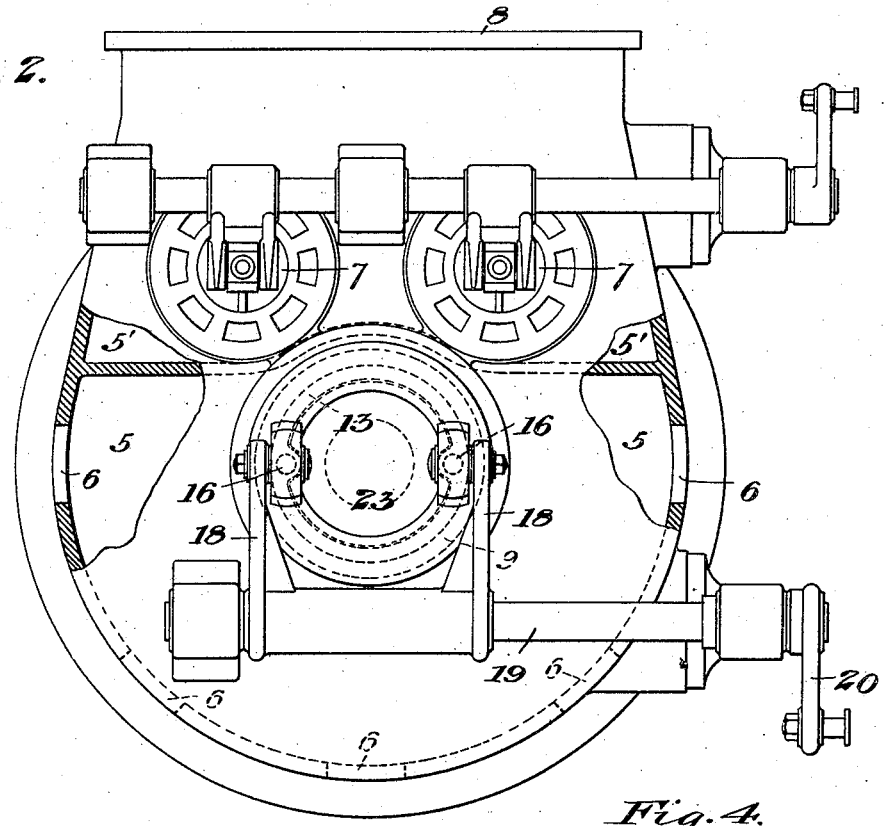
Figure 3:
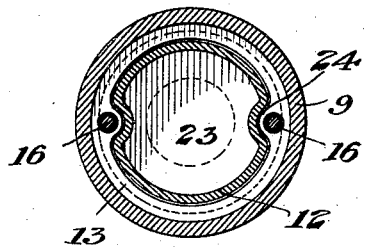
Figure 4:
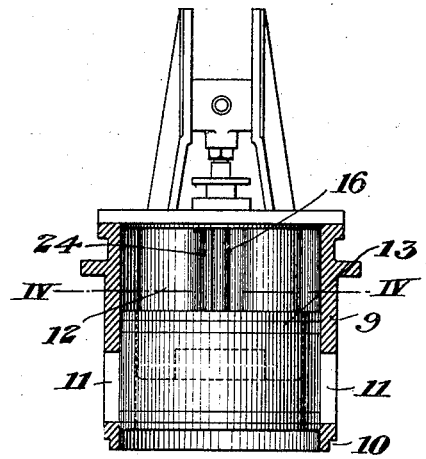

Figure 1 is a side elevation, partly broken away, showing a vertical blowing-engine provided with my improved inlet-valve. Fig. 2 is a top plan view of the same. Fig. 3 is a cross-section on the line IV IV of Fig. 4, and Fig. 4 is a side elevation of the valve with the cage broken away.

My invention relates to the class of blowing-engine valves, and more particularly to the inlet-valves.

The object of the invention is to provide a simple and effective construction in which the clearance shall be small and the valve not liable to get out of order. It is also easily accessible, balanced, and symmetrically located.

In the drawings, 2 represents the cylinder of a vertical blowing-engine having a piston 3 and piston-rod 4. Each head of the cylinder is cast in hollow form, affording a chamber 5, which extends around the inlet-valve 13.

7 7 are the outlet-valves in the wind-box 5', which is connected at 8 to the channel for leading the compressed air to the reservoir or source of use.

The central portion of each head with respect to the cylinder is cut away or formed open in the act of casting, and into this circular hole is fitted the removable annular valve-cage 9, which may be bolted or secured in any suitable manner. This cage has an annular shouldered engagement 10 with the inner wall of the head and is provided with an annular series of inclined ports separated by inclined bridges 11.

Within the cage 9 is fitted an annular hollow concentric cage 12, which is of less length than the outer cage and of smaller diameter, leaving an annular space between the two cages in which slides the annular valve 13. The inner cage for the lower head and inlet-valve is provided with a suitable stuffing-box through which the piston-rod passes, but in other respects is similar to the inner cage 12 shown in the upper head 5 for the upper inlet-valve.

The valve is provided on its outer surface with two packing-rings 14 and 15 of any suitable character, which engage the inner surface of the valve-cage 9, and it is reciprocated by two rods 16, which may be screwed into the valve and extend out through stuffing-boxes 17, preferably formed in a flange portion of the inner cage, which extends over and is secured to the outer end of the outer cage. These valve-rods are pivoted at their outer ends to rock-arms 18, extending to a rock-shaft 19, connected by crank 20 with a moving part of the engine.

The inner end of the annular valve 13 and the lower end of the inner cage 12 provide an internal recess to receive a hub or boss 21, projecting centrally from the piston 3, and the piston-rod is preferably secured to the piston by a nut 22, which is arranged to enter a central recess formed in the inner closed head 23 of the cage 12. The boss on the piston substantially fills up the clearance-space, and thus reduces the amount of clearance.

As shown in Figs. 3 and 4, the inner cage is provided with longitudinal outer grooves or recesses 24 to provide space for the valve-rods 16, the annular space between the two cages being insufficient in the form shown to accommodate these rods.

In the operation of the engine when the inlet-valve is opening the inlet-valve and the piston move away from each other, and the full opening occurs at any desired point, but preferably near the mid-stroke of the piston. During the latter portion of the stroke of the piston the inlet-valve starts to close and reaches its closed position when the piston reaches the end of its stroke. The air enters the head 5 through the openings 6, surrounds outer cage 9 for valve 13, and then passes into the cylinder through the ports in the cage 9 when the valve is open.

The inlet-valve 13 is closed by actuating connections between the valve-rods 16 and the moving element of the engine.

The outlet-valves 7 7 control the admission of air from the compressor-cylinder to the wind-box, and these valves open automatically when the desired compression has been reached and are closed by suitable connections to a moving element on the engine.

The advantages of my invention result from the simplicity and cheapness of the valve, the reducing of the clearance, the balancing of the valve, and the symmetrical actuating connections which act upon both sides of the valve simultaneously. The number of packings is small, and the valve is not liable to get out of order.

Many variations may be made in the form and arrangement of the engine, the valve, and actuating connections without departing from my invention.

I claim—

1. In a blowing-engine, a cylinder having a chambered head provided with ports, a pair of concentric valve-cages fitting centrally in said head, the outer cage having ports leading into the cylinder and arranged to connect the chamber of the head therewith, an annular valve arranged to reciprocate between the cages and connections for actuating said valve; substantially as described.

2. In a blowing-engine, a hollow head having an air-chamber provided with inlet-openings, a pair of concentric cages fitting centrally in said head, the outer cage having ports leading from the chamber of the head into the cylinder, an annular valve arranged to reciprocate between the cages, said valve having outer packing-rings, and actuating connections for the valve; substantially as described.

3. In a blowing-engine, a cylinder having a chambered head provided with ports, a pair of concentric annular valve-cages extending centrally within the head, an annular valve arranged to reciprocate between the cages and connect or disconnect the head-chamber with the cylinder, and a projection on the blowing-engine piston arranged to enter the recess afforded by the valve and the inner cage; substantially as described.

4. In a blowing-engine, a head having a chamber provided with ports, an outer annular cage fitting within the chamber and having an annular row of ports, an inner closed hollow cage fitting within the ported cage and providing an annular space between them, an outer closure for the annular space, an annular valve arranged to reciprocate between the cages and a plurality of actuating-rods connected to the valve and extending outwardly through the closure for the space between the two cages; substantially as described.

5. In a blowing-engine, a head having a chamber provided with ports, an annular cage removably secured within the chamber, and having an annular row of ports leading through it, an inner closed valve-cage having a recess at its inner end, an annular valve arranged to reciprocate between the two cages and having outer packing-rings, the inner portion of the valve having a recess, actuating connections for the valve, and a boss and nut on the piston arranged to enter the recess afforded by the valve and inner cage; substantially as described.

In testimony whereof I have hereunto set my hand.

ALBERT T. KELLER.

Witnesses:
   LENDELL A. CONNER, Jr.,
   GEO. B. BLEMING.